United States Patent [19]
Rauch

[11] 3,768,303
[45] Oct. 30, 1973

[54] MINIATURE YARN AIR GAUGE HEAD

[75] Inventor: William Theodore Rauch, Voorheesville, N.Y.

[73] Assignee: General Electric Company, New York, N.Y.

[22] Filed: Feb. 15, 1972

[21] Appl. No.: 226,437

[52] U.S. Cl. ................................ 73/37.7, 200/81.9
[51] Int. Cl. .......................................... G01b 13/02
[58] Field of Search ........................... 73/37.7, 159; 19/240; 200/81.9

[56] References Cited
UNITED STATES PATENTS

| | | | |
|---|---|---|---|
| 3,576,411 | 4/1973 | Baroin | 200/81.9 |
| 3,667,282 | 6/1972 | Czwakiel | 73/37.7 |
| 3,282,085 | 11/1966 | Benson et al. | 73/37.7 |
| 3,451,258 | 6/1969 | Westbrook | 73/37.7 |
| 2,995,801 | 8/1961 | Cormier et al. | 19/240 X |

Primary Examiner—S. Clement Swisher
Assistant Examiner—Daniel M. Yasich
Attorney—Frank L. Neuhauser et al.

[57] ABSTRACT

A miniature air gauge head for use primarily with material monitoring and/or recording devices and including a gauge base and a gauge head assembly, the gauge base being permanently mounted behind the manufacturing product line material so that the material passes in slightly spaced relation above the finished surface of the base along the length of the latter when the gauge head assembly is not assembled to the gauge base, the gauge head assembly comprising a substantially U-shaped gauge head and a gauge plate wherein the gauge plate contains a groove along its length through which the yarn, wire or fiber material to be measured travels when the gauge head assembly is assembled to the gauge base, the gauge head assembly being assembled to the gauge base by means of a dovetail construction, and air being admitted to the gauge plate through a suitable connecting line such that the air flows lengthwise through the gauge plate groove and the space remaining between the filaments being measured and the side walls of the groove.

9 Claims, 5 Drawing Figures

PATENTED OCT 30 1973  3,768,303

MINIATURE YARN AIR GAUGE HEAD

BACKGROUND OF THE INVENTION

1. Field of the Invention

My invention relates to pneumatic sensing heads preferably for use with monitoring and/or recording devices, and more particularly to a miniature air gauge head for measuring the cross-sectional area of various materials ranging from textile yarns to wire, both in monofilament and multifilament form.

2. Description of the Prior Art

Different types of sensor heads have been available heretofore in the prior art for the purpose of monitoring during manufacturing operations a parameter of the material being produced. One such sensor head is disclosed for example in U.S. Pat. No. 3,667,282, issued June 6, 1972 in the name of B.J. Czwakiel and D.F. Miller, and assigned to the same assignee as the present invention.

The sensor heads currently utilized have proven however to be deficient in performance capability in several respects. For example, by virtue of the nature of the construction of such prior art devices, it is possible for filaments of material passing through the head to become snagged and thereby broken. This is primarily attributable to the fact that it is extremely difficult to achieve the contact between the gauge plate and the base of the head assembly necessary to preclude such snagging, etc. In addition, such prior art sensor head designs are characterized by the fact that the initial loading of the head is quite difficult to accomplish. In this regard, it is desirable from the standpoint of maximizing manufacturing efficiencies that the sensor head be capable of being loaded with a continuous length of material while said material is in movement.

A further disadvantage found to inherently exist in prior art sensor heads is their inability to automatically open a sufficient extent to permit flaws in the material to pass through the sensor head as they come down the line without either causing breakage of the line or damage to the sensor. Another cause of objection with regard to prior art sensor devices has been directed to the relative bulkiness of such devices.

OBJECTS OF THE INVENTION

It is therefore an object of the present invention to provide a novel and improved miniature air gauge head preferably for use in measuring the cross-sectional area of various materials which head is characterized by its ability to be easily loaded with a continuous length of material to be measured while said material is in motion.

It is another object of the present invention to provide such a miniature air gauge head for use in measuring the cross-sectional area of various materials which head by virtue of its small size occupies considerably less space than prior art devices thereby enabling more compact arrangements of the head to be made as well as permitting application of the head to closely spaced lines of process material.

A further object of the present invention is to provide such a miniature air gauge head for use in measuring the cross-sectional area of various materials which head permits improved contact to be obtained over the entire flat surface area between the gauge plate and base thereby virtually eliminating any possibility of snagging of the fine individual filaments in the material being measured.

A still further object of the present invention is to provide such a miniature air gauge head for use in measuring the cross-sectional area of various materials which head provides the added capability of being able to separate to some extent to accommodate the passage therethrough of an enlargement of material should such an enlargement of a size otherwise incapable of passing through the gauging groove come down the line.

Yet another object of the present invention is to provide such a miniature air gauge head for use in measuring the cross-sectional area of various materials which head is relatively easy to manufacture and assemble while yet providing long life and reliability in operation.

SUMMARY OF THE INVENTION

In accordance with a preferred form of the invention there is provided a miniature air gauge head for use in measuring the cross-sectional area of various materials ranging from textile yarns to wire, both in monofilament and multifilament form. The miniature air gauge head includes a gauge base and a gauge head assembly. The gauge base is intended to be permanently mounted behind the manufacturing product line material so that the material passes in slightly spaced relation above the finished surface of the base along the length of the latter, when the gauge head assembly is not assembled to the gauge base. The gauge head assembly comprises a substantially U-shaped gauge head and a gauge plate. The gauge plate contains a groove along its length through which the yarn, wire or fiber material to be measured travels when the gauge head is assembled to the gauge base. The gauge head assembly is assembled to the gauge base by means of a dovetail construction. For this purpose the gauge head is provided with a pair of inwardly extending projections which are received in cooperating slots suitably provided in the gauge base. A spring is provided interposed between the inner surface of the gauge head and the nonslotted surface of the gauge plate such that the spring forces these two members apart to the degree permitted by a retaining pin which passes through both members and an appropriate clearance hole in the gauge plate. When the gauge head assembly is assembled to the gauge base, the spring force exerted against the gauge plate is utilized to obtain intimate contact between the finished top surface on the gauge base and the finished surface on the gauge plate adjacent to the measuring groove. Air which is admitted to the gauge plate through a suitable connecting line flows lengthwise through the gauge plate groove and the space remaining between the filaments being measured and the side walls of the groove. The back pressure of the air being supplied to the gauge plate is indicative of the resistance to air flow caused by the material passing through the groove in the gauge plate. Further, since the resistance caused by the material is a function of the cross-sectional area thereof, by sensing the back pressure of the air flow to the gauge plate the cross-sectional area of the material in the groove of the gauge plate may be determined.

The invention will be more fully understood from the following detailed description and its scope will be pointed out in the appended claims.

DESCRIPTION OF A PREFERRED EMBODIMENT

Figure 1:
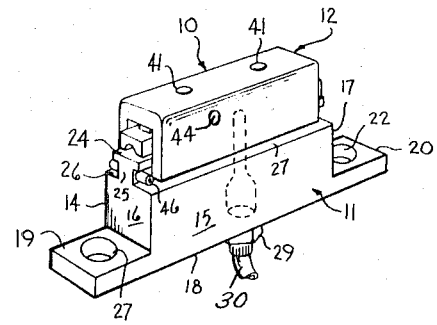
FIG. 1 is a perspective view of the miniature air gauge head in accordance with the present invention.
Figure 2:
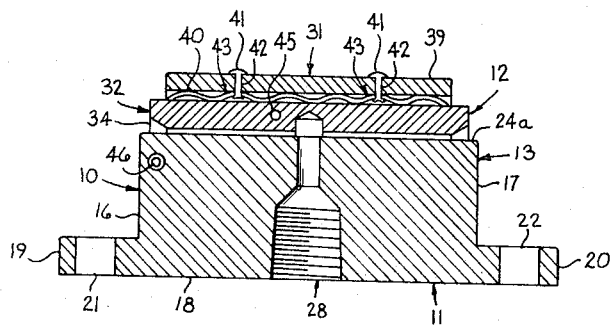
FIG. 2 is a cross-sectional side view of the miniature air gauge head of FIG. 1 in accordance with the present invention.
Figure 3:
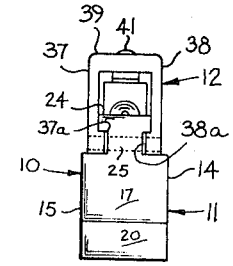
FIG. 3 is an end view of the miniature air gauge head of FIG. 1 in accordance with the present invention.

Referring to FIGS. 1, 2 and 3 of the drawing, the invention as illustrated therein comprises a miniature air gauge head, generally designated by reference numeral 10, preferably for use with on-line material monitoring and/or measurement recording devices, and including a gauge base 11 and a gauge head assembly 12. The gauge head 10 is most commonly constructed of a specially processed, high-durability, friction-reduced, aluminum material. However, for employment in certain other specific applications, the gauge head 10 may, if so desired, also be constructed of other materials such as stainless steel, plastic, etc.

Gauge base 11 as best seen in FIGS. 1–3 and 5 comprises a relatively narrow, substantially rectangular block 13 including a pair of side walls 14 and 15, a pair of end walls 16 and 17, and a bottom wall 18. Each of end walls 16 and 17 has a foot portion 19 and 20, respectively, projecting outwardly therefrom. As shown in the drawing, foot portions 19 and 20 are formed integrally with end walls 16 and 17, respectively. However, it is to be understood that if so desired foot portions 19 and 20 may take the form of separate members suitably affixed by conventional fastening means to the end walls 16 and 17. Foot portions 19 and 20 are each provided with an opening 21 and 22, respectively, capable of receiving a suitable fastener (not shown) whereby to permit gauge base 11 to be permanently mounted behind a material manufacturing product line (not shown) in a manner to be more fully set forth subsequently.

Gauge base 11 includes a substantially T-shaped top surface 23 extending the length of block 13 from end wall 16 to end wall 17. T-shaped top surface 23 is formed by member 24, and upstanding member 25 which projects outwardly from the block 13 at right angles to the plane of member 24. In accordance with the preferred embodiment of the invention, the outermost surface 24a of member 24 for a reason which will become more apparent later is preferably provided with a 16 micro inch finish. A pair of slots 26 and 27, extending the length of block 13 between end walls 16 and 17, are provided along either side of upstanding member 25 for a purpose to be more fully described hereinafter.

Also, gauge base 11 is provided with an opening 28 which extends entirely through the block 13 from bottom wall 18 to the micro finish surface 24a of member 24. As depicted in the drawing, the portion 28a of opening 28 which communicates with the bottom wall 18 of gauge base 11 has a substantially greater diameter than the portion 28b of opening 28 which communicates with the micro finish surface 24a of member 24. Further the portion 28a of opening 28 is preferably threaded to enable the latter to receive a suitable fitting 29. With the fitting 29 threaded in the portion 28a of opening 28, the fitting 29 enables one end of a tubing 30 to be connected thereto with the other end of the tubing 30 being connected to an air source (not shown).

Figure 4:
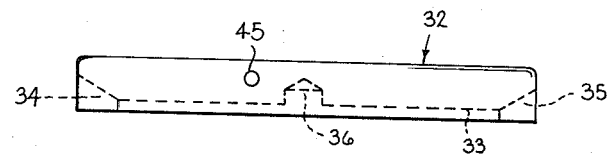
FIG. 4 is a side view of the slotted gauge plate of the gauge head assembly of the miniature air gauge head of FIG. 1 in accordance with the present invention.
Figure 5:
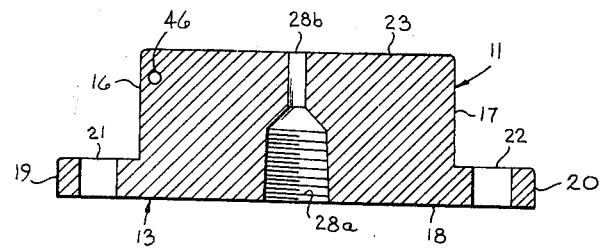
FIG. 5 is a cross-sectional side view of the gauge base of the miniature air gauge head of FIG. 1 in accordance with the present invention.

Referring now to FIGS. 1–4 of the drawing, the gauge head assembly 12 of miniature air gauge head 10 includes a substantially U-shaped gauge head 31 and a gauge plate 32. As best understood with reference to FIGS. 1 and 2, the relative lengths of gauge head 31 and gauge plate 32 are such that gauge plate 32 is slightly shorter than the portion of block 13 extending between end walls 16 and 17, and gauge head 31 is slightly shorter in length than gauge plate 32. Referring particularly to FIG. 4 of the drawing, gauge plate 32 as depicted therein includes a groove 33 which extends the entire length thereof and through which the yarn, wire or fiber material to be measured travels when the gauge head assembly 12 is assembled to the gauge base 11 in a manner yet to be described. Gauge plate groove 33 is preferably dimensioned such that groove 33 will be filled by the cross-sectional area of the material to be measured to an extent of approximately 20 to 60 percent. Thus, in accordance with the preferred embodiment of the invention, it is contemplated that a plurality of interchangeable gauge plates 32 having formed therein grooves 33 of differing dimensions will be employed to measure material of differing cross-sections. More particularly, it has been found that a total of eight gauge plates 32 having grooves 33 differing in diameter from 0.085 inch to 0.020 inch are sufficient to accommodate for example most yarn from 300 to over 5000 denier. Of course, it is also contemplated that other gauge plates 32 may be provided with grooves 33 dimensioned as may be necessary to meet specific needs.

Referring now further to FIG. 4 of the drawing, as depicted therein each end of groove 33 is preferably provided with a conical taper 34, 35 which functions to guide the material to be measured as the material enters and leaves gauge plate groove 33. In addition, gauge plate groove 33 is provided with an enlarged portion in the form of a hole 36 located substantially midway along the length thereof. More specifically, hole 36 is suitably located along the length of groove 33 such that when gauge head assembly 12 is assembled to gauge base 11, hole 36 is positioned in juxtaposed relation to previously described portion 28b of opening 28 whereby to be in fluid communication therewith.

Considering now U-shaped gauge head 31, it is seen with reference to FIGS. 1–3 that gauge head 31 includes a pair of depending legs 37, 38 interconnected by medial portion 39. Depending legs 37 and 38 are suitably spaced relative to each other and are of sufficient length such as to permit gauge plate 32 to be received therebetween and such that when gauge head assembly 12 is assembled to gauge base 11, member 24 of top surface 23 of block 13 of the gauge base 11 is also capable of being received in the hollow interior of U-shaped gauge head 31 defined by depending legs 37, 38 and medial portion 39. The outermost end of each of depending legs 37 and 38 is provided with an integrally formed, inwardly extending projection 37a and 38a, respectively. In addition as depicted in FIG. 2 of the drawing, a wave spring 40 is interposed between U-shaped gauge head 31 and gauge plate 32 in the space therebetween provided for this purpose. Wave spring 40 which extends the length of U-shaped gauge head 31 is affixed to the inner surface of the medial portion 39 thereof by any suitable fastening means such as for example a pair of suitably spaced rivets 41. The medial portion 39 of U-shaped gauge head 31 as well as wave spring 40 are therefore each provided with a pair of openings 42 and 43, respectively, for the purpose of receiving the aforedescribed rivets 41.

With regard to the method of assembly of the component parts which comprise gauge head assembly 12, wave spring 40 is first positioned adjacent the inner surface of medial portion 39 and thereafter affixed in place by means of the aforementioned pair of rivets 41. Gauge plate 32 is then inserted into the hollow interior of U-shaped gauge head 31 defined by depending legs 37, 38 and medial portion 39 such that groove 33 of gauge plate 32 faces downwardly as viewed in FIGS. 1, 2 and 3 and such that the other surface of gauge plate 32 opposite that in which groove 33 is formed is in abutting contact with one surface of wave spring 40. Gauge plate 32 is retained in the aforedescribed position by means of a retaining pin 44 which passes through suitable openings (not shown) provided for this purpose in each of depending legs 37 and 38 of U-shaped gauge head 31. In addition, retaining pin 44 passes through an appropriately dimensioned clearance hole 45 provided in gauge plate 32. The dimension of clearance hole 45 is purposely selected such as to permit gauge plate 32 to move to some extent relative to the medial portion 39 of U-shaped gauge head 31 under the influence of wave spring 40 as will be described more fully hereinafter. At this point it is deemed sufficient to merely note that in the aforedescribed assembled condition gauge plate 32 is biased away from medial portion 39 by wave spring 40. Further, it is to be noted that for purposes of clarity of description and illustration, retaining pin 44 has not been shown positioned in clearance hole 45 in FIG. 2 of the drawing.

Proceeding now with a description of the mode of operation of the miniature air gauge head 10, gauge base 11 is first permanently mounted behind the material manufacturing product line by means of fasteners passing through openings 21 and 22 provided for this purpose in foot portions 19 and 20, respectively. Gauge base 11 is mounted so that the material to be measured is passing above the micro finish surface 24 of the top surface 23 of gauge base 11 along its length, and approximately one-eighth to three-eighths inches above the surface 24 when the gauge head assembly 12 is not assembled to gauge base 11. Inasmuch as during operating conditions the material to be measured as will be described hereinafter is captured between groove 33 of gauge plate 32 and surface 24 of the top surface 23 of gauge base 11, it is preferable to provide surface 24 with a micro finish whereby to improve the high durability characteristics thereof for long wear and to ensure that good contact will be made between surface 24 and the grooved surface of gauge plate 32 so as to preclude snagging of the filaments of the material being measured.

To assemble gauge head assembly 12 to gauge base 11, head assembly 12 is brought into engagement with the continuous line of material at a point upstream from the location at which gauge base 11 is permanently mounted. Gauge head assembly 12 is brought into engagement with the material such that the material travels through groove 33 formed in gauge plate 32. Thereafter gauge head assembly 12 is moved downstream along the continuous line of material with inwardly extending projections 37a and 38a formed at the outermost ends of depending legs 37 and 38, respectively, sliding in the slots 26 and 27 formed on either side of upstanding member 25 of the T-shaped top surface 23 of gauge base 11. Gauge head assembly 12 is slid along the top of gauge base 11 in the aforedescribed manner until the forward surface of depending legs 37 and 38 engages a suitable stop means which may for example be in the nature of a pin such as that illustrated at 46 in the drawings. The latter pin 46 passes through a suitable opening (not shown) provided for this purpose in upstanding member 25 and projects outwardly therefrom on either side thereof into the path of the sliding depending legs 37 and 38. It is thus seen that the gauge head assembly 12 is assembled to gauge base 11 by means of a dovetail sliding engagement between inwardly extending projections 37a and 38a of the gauge head assembly 12 and the slots 26 and 27 of gauge base 11.

With the gauge head assembly 12 and the gauge base 11 assembled in the aforedescribed manner, the spring force exerted by wave spring 40 against the gauge plate 32 is utilized to obtain intimate contact between the finished surface 24 on the gauge base 11 and the surface of the gauge plate 32 adjacent to the measuring groove 33. The latter surface of the gauge plate 32 is preferably provided with a micro finish surface similar to that of surface 24 of gauge base 11 for the same reasons enumerated hereinabove with regard to the latter surface 24. Intimate contact is ensured between surface 24 and the grooved surface of gauge plate 32 by virtue of the fact that wave spring 40 forces gauge plate 32 and the medial portion 39 of U-shaped gauge head 31 apart to the degree allowed by the retaining pin 44 which passes through the openings provided therefor in the depending legs 37 and 38 of U-shaped gauge head 31 and the appropriately dimensioned clearance hole 45 in guage plate 32. Further with the gauge plate 32 being biased into engagement with the micro finish surface 24 of gauge base 11, the cross-sectional area of the gauge groove 33 will be filled by the cross-sectional area of the material to be measured to an extent of approximately 20 to 60 percent. On the other hand by virtue of the relative movement which is permitted between gauge plate 32 and medial portion 39 of U-shaped gauge head 31 by wave spring 40 and clearance hole 45, gauge plate 32 is capable of separating to some extent relative to surface 24 of gauge base 11 whereby to permit an enlarged portion, i.e., a flaw to pass through the miniature air gauge head 10 without causing the continuous line of material to break, or causing damage to the miniature air gauge head 10.

Air is admitted to the miniature air gauge head 10 through tubing 30 which in turn is connected to fitting 29 with the latter being threadedly received in opening 28. This air flows through portion 28a and portion 28b of opening 28 to the enlarged section, i.e., hole 36 provided substantially midway along the length of groove 33 of gauge plate 32. From there, the air flows lengthwise through the gauge plate groove 33 and the space remaining between the filaments being measured and the side walls of the groove 33. The air is then permitted to escape to the atmosphere from the ends of groove 33. Since the air must pass by the filaments or through the fiber bundle traveling through groove 33 to reach atmospheric pressure, the material being measured presents a resistance to the flow of air. This determines the magnitude of the air pressure in tubing 30. Yarns and slivers that are below the desired density, or filaments, wire, threads, ropes, etc., that are below the desired diameter, present less flow resistance, causing a low value of air pressure in tubing 30. The converse is also true. That is, if the material being measured is more dense or of a larger diameter, an increase in the air pressure in tubing 30 will occur. The change in air pressure in tubing 30 is directly proportional to the change in density or diameter of the measured material at any given time. These minute pressure changes are preferably amplified by suitable conventional fluidic amplifiers. Thereafter the afore-described amplified signal may be recorded by suitable chart means, or employed to trigger some form of indicating means such as lights, etc., or to initiate some form of controlling operation relative to the machine which is producing the material being measured.

Thus, in accordance with the present invention there has been provided a novel and improved miniature air gauge head which is characterized by its ability to be easily loaded with a continuous length of material to be measured while said material is in motion. Further in accordance with the present invention the subject miniature air gauge head also by virtue of its small size occupies considerably less space than prior art devices thereby enabling more compact arrangements of the head to be made as well as permitting application of the head to closely spaced lines of process material. In addition, such a miniature air gauge head permits improved contact to be obtained over the entire flat surface area between the gauge plate and gauge base thereby virtually eliminating any possibility of snagging of the fine individual filaments in the material being measured. Moreover, the subject miniature air gauge head provides the added capability of being able to separate to some extent to accommodate the passage therethrough of an enlargement of material should such an enlargement of a size otherwise incapable of passing through the gauging groove come down the line. Finally, the miniature air gauge head of the present invention is relatively easy to manufacture and assemble while yet providing long life and reliability in operation.

While only one embodiment of my invention has been shown, it will be appreciated that modifications thereof may readily be made therein by those skilled in the art. A number of such modifications have been mentioned in the course of the preceding description of the subject invention. I therefore intend by the appended claims to cover the latter modifications as well as all other modifications which fall within the true spirit and scope of my invention.

What I claim as new and desire to secure by Letters Patent of the United States is:

1. A fluidic gauge head sensor for measuring a parameter of a continuous moving materials ranging from textile yarns to wires, both in monofilament and multifilament form comprising:
   a. a first member having a first surface;
   b. a second member having a first surface for mating with the first surface of said first member;
   c. at least one of the mating surfaces having a groove therein for guiding and receiving the material passing through and being measured by said head sensor;
   d. means passing through one of said members for fluidically interconnecting said groove with a fluid source of supply;
   e. a housing member for retaining said second member therein;
   f. said housing member and said first member having respective interconnecting and mating portions for allowing said housing member to slidingly engage said first member; and
   g. resilient biasing means interposed and maintained between said second member and said housing member for forcing and holding the respective surfaces of said first and second members in mating engagement and for holding said housing member and said first member together after said housing member is placed in sliding and interconnecting engagement with said first member.

2. A sensor according to claim 1 wherein said first member is a base member and said base member further comprises:
   a. means for mounting said base member adjacent the path of movement of the material.

3. A sensor according to claim 2 wherein said mounting means further includes first and second foot portions extending from said base member, each of said foot portions having a hole therein for receiving a fastener.

4. A sensor according to claim 1 wherein said groove extends from and adjacent the first surface of said second member, and said fluidically interconnecting means includes said first member having a second surface opposite its first surface and a passageway connecting the second surface with that portion of the first surface of said first member adjacent said groove.

5. A sensor according to claim 1 wherein said respective mating portions of said housing member and said first member includes said first member having at least one slot within one side thereof and said housing member having at least one inwardly extending portion slidingly engaging the slot in the side of said first member.

6. A sensor according to claim 1 wherein said resilient biasing means is comprised of a wave spring fastened to said housing member.

7. A miniature fluidic gauge head for measuring a parameter of various materials ranging from textile yarns to wires, both in monofilament and multifilament form, comprising:
   a. base means including at least a pair of end walls, a bottom wall, and a top surface;
   b. at least one of said pair of end walls including mounting means for mounting said base means adjacent the path of movement of said material to be measured;
   c. said base means further including fluid passage means connectable to a source of fluid, said fluid passage means extending through said base means from said bottom wall to said top surface of said base means;
   d. head assembly means including a substantially U-shaped gauge head, a gauge plate, and resilient biasing means;

e. said substantially U-shaped gauge head having a pair of depending leg portions interconnected by a medial portion;

f. first fastening means securing said resilient biasing means to said U-shaped gauge head in juxtaposed relation to the inner surface of said medial portion thereof;

g. second fastening means movably mounting said gauge plate to said U-shaped gauge head between said pair of depending leg portion thereof and in juxtaposed relation to said resilient biasing means;

h. said gauge plate including a groove for receiving and guiding said material therethrough to be measured; and i. assembly means for slidably assembling said head assembly means to said base means with said groove of said gauge plate in juxtaposed relation to said top surface of said base means such that said material to be measured is enclosed therebetween, and with said groove of said gauge plate in fluid communication with said fluid passage means for receiving fluid therefrom wherein the fluid pressure in said fluid passage means is proportional to the amount of resistance to the flow of fluid through said groove presented by said material received in said groove of said gauge plate.

8. A miniature fluidic gauge head as set forth in claim 7 wherein:

a. each of said end walls of said base means includes mounting means;

b. each of said mounting means comprises a foot portion integrally formed with one of said end walls and having an opening therein for receiving a fastener;

c. said resilient biasing means comprises a wave spring; and d. said fluid is air.

9. A miniature fluidic gauge head as set forth in claim 7 wherein:

a. said assembly means comprises a dovetail construction including an inwardly extending projection integrally formed at the outermost end of each of said pair of depending leg portions of said U-shaped gauge head, and a pair of slots formed in said top surface of said base means wherein to assemble said head assembly means to said base means each of said inwardly extending projections is slid into and along a corresponding one of said pair of slots formed in said top surface; and b. said base means further includes stop means for properly positioning said head assembly means relative to said base means in the assembled condition thereof, said stop means comprising a pin mounted in said top surface of said base means such as to project outwardly therefrom into the path of movement of said pair of depending leg portions of said U-shaped gauge head.

* * * * *